United States Patent
Thakur et al.

(10) Patent No.: US 10,472,513 B2
(45) Date of Patent: Nov. 12, 2019

(54) POLYMERIC FORMULATION WITH DIRT PICK-UP RESISTANCE

(71) Applicant: Dow Global Technologies LLC, Midland, MI (US)

(72) Inventors: Varun Thakur, Horgen (CH); Stefan Ultsch, Horgen (CH); Jouko Vyoerykkae, Horgen (CH); Jozef J. Van Dun, Horgen (CH); Eva-Maria Kupsch, Horgen (CH)

(73) Assignee: Dow Global Technologies LLC, Midland, MI (US)

(*) Notice: Subject to any disclaimer, the term of this patent is extended or adjusted under 35 U.S.C. 154(b) by 47 days.

(21) Appl. No.: 15/740,500

(22) PCT Filed: Jun. 20, 2016

(86) PCT No.: PCT/US2016/038400
§ 371 (c)(1),
(2) Date: Dec. 28, 2017

(87) PCT Pub. No.: WO2017/003744
PCT Pub. Date: Jan. 5, 2017

(65) Prior Publication Data
US 2018/0186996 A1     Jul. 5, 2018

Related U.S. Application Data

(60) Provisional application No. 62/186,733, filed on Jun. 30, 2015.

(51) Int. Cl.
| | | |
|---|---|---|
| C08L 53/00 | (2006.01) | |
| C08L 23/08 | (2006.01) | |
| C08L 51/06 | (2006.01) | |
| C08L 33/02 | (2006.01) | |
| C08K 3/016 | (2018.01) | |
| C08K 3/22 | (2006.01) | |

(52) U.S. Cl.
CPC ............. *C08L 53/00* (2013.01); *C08K 3/22* (2013.01); *C08L 23/0869* (2013.01); *C08L 33/02* (2013.01); *C08L 51/06* (2013.01); *C08K 3/016* (2018.01); *C08L 2201/02* (2013.01); *C08L 2205/025* (2013.01)

(58) Field of Classification Search
CPC ........ C08L 33/08; C08L 33/10; C08L 33/012; C08L 51/06; C08L 53/00; C08L 2205/025; C08K 3/016
See application file for complete search history.

(56) References Cited

U.S. PATENT DOCUMENTS

| | | |
|---|---|---|
| 7,608,668 B2 | 10/2009 | LiPiShan et al. |
| 2010/0029827 A1 | 2/2010 | Ansems et al. |
| 2010/0093942 A1 | 4/2010 | Silvis et al. |
| 2010/0319960 A1 | 12/2010 | Cree et al. |
| 2013/0059989 A1 | 3/2013 | Ansems et al. |
| 2014/0367144 A1 | 12/2014 | Segawa et al. |
| 2017/0198111 A1* | 7/2017 | Chen ............... B32B 5/022 |

FOREIGN PATENT DOCUMENTS

| | | |
|---|---|---|
| GB | 2518043 A | 3/2015 |
| WO | WO 2014000177 | * 1/2014 |

OTHER PUBLICATIONS

A. Dobrynin, J. Chem. Phys., 107(21), 1997, pp. 9234-9238.
I.I. Potemkin, Physical Review E, vol. 57, No. 6, 1998, pp. 6902-6912.

* cited by examiner

*Primary Examiner* — Jeffrey C Mullis
(74) *Attorney, Agent, or Firm* — Husch Blackwell LLP

(57) ABSTRACT

The present disclosure provides a composition. In an embodiment, the composition includes A) an ethylene/acrylate interpolymer or an ethylene/acetate interpolymer; B) an ethylene/α-olefin multi-block copolymer; and C) a flame retardant. In an embodiment, the ethylene/acrylate interpolymer is a functionalized ethylene/acrylate interpolymer. The present composition exhibits improved dirt pick-up resistance.

16 Claims, No Drawings

POLYMERIC FORMULATION WITH DIRT PICK-UP RESISTANCE

BACKGROUND

Resistance to dirt is important in applications where the finished product is exposed to contamination. Sources of contamination include, for example, soil, air pollution, toxic gases, hydrolysis or fluids, and chemicals. Applications such as textile architecture, roofing membranes, geo-membranes, industrial tank liners, industrial containers, industrial packaging, automotive dashboards—are some examples of end-products exposed to contamination.

Resistance to dirt (or contamination) is measured quantitatively as dirt pick-up resistance (or DPUR). Conventionally, materials such as polyolefins, achieve DPUR by (i) applying a special coating thereto (coating based on acrylic, polyurethane, fluoro-silane, polyvinyl dichloride, UV curing inks), and/or (ii) surface modification techniques (gas phase fluorination, electron beam grafting), and/or (iii) the use of surface modifiers (polydimethylsiloxanes, nano-silica).

The art recognizes the need for materials that have DPUR without the need for a coating or a secondary production process.

SUMMARY

The present disclosure is directed to a polyolefin-based composition with improved DPUR achieved without the need for any of the described coatings or secondary production processes.

The present disclosure provides a composition. In an embodiment, the composition includes
A) an ethylene/acrylate interpolymer or an ethylene/acetate interpolymer;
B) an ethylene/α-olefin multi-block copolymer; and
C) a flame retardant.

In an embodiment, the ethylene/acrylate interpolymer is a functionalized ethylene/acrylate interpolymer.

The present disclosure provides an article. The article contains the present composition.

In embodiment, the article is a roofing membrane. The roofing membrane includes at least one layer containing the present composition. The composition comprises
(A) from 5 wt % to 30 wt % of a grafted ethylene/acrylate interpolymer or an ethylene/acetate interpolymer;
(B-1) from 15 wt % to 25 wt % of a first ethylene/α-olefin multi-block copolymer;
(B-2) from 10 wt % to 20 wt % of a second ethylene/α-olefin multi-block copolymer, the second ethylene/α-olefin multi-block copolymer different than the first ethylene/α-olefin multi-block copolymer; and
(C) from 40 wt % to 55 wt % of a flame retardant.

An advantage of the present disclosure is a composition with improved dirt pick-up resistance (DPUR).

An advantage of the present disclosure is an article with improved DPUR.

An advantage of the present disclosure is a roofing membrane with improved DPUR.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792.

Dirt pick-up resistance (DPUR) is the ability of a material to maintain its original appearance with respect to soiling of the surface due to exterior environmental conditions. DPUR tests are performed in accordance with ASTM D 3719 following the procedure below.

Polyolefin membranes are prepared for ultra-violet (UV) exposure by blocking ⅓ of the membrane with aluminum foil to prevent UV exposure in that area Then polyolefin membranes are placed in QUV® accelerated weathering tester manufactured by Q-lab for 24 hours. QUV® accelerated weathering testers are used to reproduce the damage caused by sunlight, rain, and dew. This QUV® tester is equipped with B-bulbs and run using ISO 4892-3 cycle Artificial dirt is prepared by mixing following components in dissolver for 5 minutes
25 g water
25 g Bayferrox 130M (iron oxide)
0.125 g Orotan 731 A-ER Iron oxide dirt slurry is applied to the ⅔ of the bottom half of the polyolefin membranes and allowed to dry for 4 hours Then membranes are placed under cold running tap water and dried dirt slurry is scrubbed with a cheese cloth After cleaning, the membranes are allowed to dry for 2 hours and then color is measured and Delta E value is reported DPUR is reported as a "Delta E value." Delta E is the total change in color defined by the following formula (1)

$$\text{Delta } E = \sqrt{\Delta L^2 + \Delta b^2 + \Delta a^2} \quad \text{(Formula 1)}$$

wherein, L, a, and b represent the three axes of the color system.

A Byk Spectro-guide (sphere) gloss spectrophotometer, version 4.51, Catalogue no. 6834 (serial no. 1166110) is used to determine the Delta E value.

Elongation at break (machine direction) is measured in accordance with ASTM D 628. Results are reported in percent (%).

An "ethylene-based polymer," as used herein is a polymer that contains a majority amount of polymerized ethylene monomer (based on the weight of the polymer) and, optionally, may contain at least one comonomer.

Flame retardance is evaluated using a Small Burner Test (EN 11925-2) with surface ignition. The pass/fail scenario is reported.

The test involves exposing the surface of the sample to the flame tilted at 45 deg for 30 seconds. After 30 seconds, the flame is removed and after 30 seconds, the length of the flame on the burning sample is observed. If the total burnt length is less than 150 mm within 60 seconds, the sample passes the test. The flaming droplets are also noted.

Melt flow rate (MFR) is measured in accordance with ASTM D 1238, Condition 230° C./2.16 kg (g/10 minutes).

Melt index (MI) is measured in accordance with ASTM D 1238, Condition 190° C./2.16 kg (g/10 minutes).

Shore A hardness is measured in accordance with ASTM D 2240.

Tensile strength (machine direction) is measured in accordance with EN ISO 527. Results are reported in megaPascals (MPa).

Tm or "melting point" as used herein (also referred to as a melting peak in reference to the shape of the plotted DSC curve) is typically measured by the DSC (Differential Scanning Calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

An "olefin-based polymer," as used herein is a polymer that contains a majority amount of polymerized olefin monomer (based on the weight of the polymer), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, (employed to refer to polymers prepared from only one type of monomer, with the understanding that trace amounts of impurities can be incorporated into the polymer structure), and the term copolymer (typically employed to refer to polymers prepared from at least two types of monomers). It also embraces all forms of copolymer, e.g., random, block, etc. The terms "ethylene/α-olefin polymer" and "propylene/α-olefin polymer" are indicative of copolymer, as described above, prepared from polymerizing ethylene or propylene, respectively, and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer. Trace amounts of impurities, for example, catalyst residues, may be incorporated into and/or within the polymer.

An interpolymer, as used herein, refers to a polymer prepared by the polymerization of at least two different types of monomers. The generic term interpolymer thus includes copolymers (employed to refer to polymers prepared from two different types of monomers), and polymers prepared from more than two different types of monomers.

A "propylene-based polymer" is a polymer that contains more than 50 mole percent polymerized propylene monomer (based on the total amount of polymerizable monomers) and, optionally, may contain at least one comonomer.

DETAILED DESCRIPTION

The present disclosure provides a composition. In an embodiment, the composition includes A) an ethylene/acrylate interpolymer or an ethylene/acetate interpolymer;

B) an ethylene/α-olefin multi-block copolymer; and

C) a flame retardant.

In an embodiment, the present composition includes an ethylene/acrylate interpolymer. The term, "ethylene/acrylate interpolymer," as used herein, is an interpolymer that comprises ethylene monomer and acrylate comonomer. Nonlimiting examples of suitable ethylene/acrylate interpolymer include ethylene ethyl acrylate (EEA), ethylene methyl acrylate (EMA) and ethylene methyl methacrylate, and ethylene butyl acrylate (EBA).

1. Functionalized Ethylene/Acrylate Interpolymer

In an embodiment, the ethylene/acrylate interpolymer is a functionalized ethylene/acrylate interpolymer. The term "functionalized ethylene/acrylate interpolymer," as used herein, is an interpolymer that comprises ethylene monomer, acrylate comonomer, and at least one functional group comprising at least one heteroatom.

A heteroatom is defined as an atom which is not carbon or hydrogen. Common heteroatoms include, but are not limited to, oxygen, nitrogen, sulfur, and phosphorus. The functional group is linked by a covalent bond and may or may not be part of the polymer chain. Nonlimiting examples of suitable functional groups include carboxylic acids, esters, and anhydrides.

In an embodiment, the functionalized ethylene/acrylate interpolymer is a grafted ethylene/acrylate interpolymer whereby the functional group is covalently bonded pendant to the polymer chain. Nonlimiting examples of grafted ethylene/acrylate interpolymer include anhydride grafted ethylene/acrylate interpolymer (for example, maleic anhydride grafted ethylene/acrylate interpolymer interpolymer (MAH-g-EA)), maleic anhydride grafted ethylene ethyl acrylate (MAH-g-EEA), maleic anhydride grafted ethylene methyl acrylate (MAH-g-EMA), maleic anhydride grafted ethylene butyl acrylate (MAH-g-EBA), glycidyl methacrylate grafted ethylene ethyl acrylate (GMA-g-EEA), glycidyl methacrylate grafted ethylene methyl acrylate (GMA-g-EMA), glycidyl methacrylate grafted ethylene butyl acrylate (GMA-g-EBA), and any combination thereof.

In an embodiment, the functionalized ethylene/acrylate interpolymer is MAH-g-EEA.

In an embodiment, the functionalized ethylene/acrylate interpolymer is MAH-g-EEA having one, some, or all of the following properties:

(i) a density from 0.880 g/cc, or 0.885 g/cc, or 0.890 g/cc, or 0.900 g/cc, or 0.910 g/cc to 0.917 g/cc, or 0.920 g/cc, or 0.930 g/cc;

(ii) a melt index, MI, from 5.0 g/10 min, or 6.0 g/10 min, or 7.0 g/10 min to 7.5 g/10 min, or 8.0 g/10 min, or 10.0 g/10 min; and (iii) a MAH-graft level from 0.1 wt %, or 0.15 wt % to 0.18 wt %, or 0.20 wt %, or 0.25 wt % based on the total weight of the MAH-g-EEA.

A nonlimiting example of suitable MAH-g-EEA is sold under the tradename AMPLIFY TY 4351, available from The Dow Chemical Company.

The present functionalized ethylene/acrylate interpolymer may comprise two or more embodiments disclosed herein.

2. Ethylene/α-Olefin Multi-Block Copolymer

The present composition includes an ethylene/α-olefin multi-block copolymer. The term "ethylene/α-olefin multi-block copolymer" includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this means polymerized units thereof. In some embodiments, the ethylene/α-olefin multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the ethylene/α-olefin multi-block copolymer may comprise 50 mol % to 90 mol % ethylene, or 60 mol % to 85 mol %, or 65 mol % to 80 mol % ethylene. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3.0, or from 1.8 to 2.5, or from 1.8 to 2.2. When produced in a batch or a semi-batch process, the ethylene/α-olefin multi-block copolymer possesses Mw/Mn from 1.0 to 3.5, or from 1.3 to 3.0, or from 1.4 to 2.5, or from 1.4 to 2.0.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In an embodiment of this disclosure, the ethylene/α-olefin multi-block copolymer is defined as having one, some, any combination of, or all the properties (A)-(G) below:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299 \Delta H + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30 carbon atoms, or 4 to 12 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 4 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The ethylene/α-olefin multi-block copolymer can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In an embodiment, the ethylene/α-olefin multi-block copolymer is an ethylene/$C_{4-12}$ α-olefin multi-block copolymer, has hard segments and soft segments and is defined as having:

a Mw/Mn from 1.7 to 3.5, at least one melting point, Tm, in degrees Celsius, and a density, d, in grams/cubic centimeter, where in the numerical values of Tm and d correspond to the relationship:

$$Tm < -2002.9 + 4538.5(d) - 2422.2(d)^2,$$

where d is from 0.86 g/cc, or 0.87 g/cc, or 0.88 g/cc to 0.89 g/cc; and

Tm is from 80° C., or 85° C., or 90° C. to 95, or 99° C., or 100° C., or 105° C. to 110° C., or 115° C., or 120° C., or 125° C.

In an embodiment, the ethylene/α-olefin multi-block copolymer is an ethylene/$C_{4-12}$ α-olefin multi-block copolymer and has one, some, any combination of, or all the properties (i)-(x) below:
  (i) a Mw/Mn from 1.7, or 1.8 to 2.2, or 2.5, or 3.5;
  (ii) a melt temperature (Tm) from 80° C., or 85° C., or 90° C. to 95, or 99° C., or 100° C., or 105° C. to 110° C., or 115° C., or 120° C., or 125° C.;
  (iii) a density from 0.86 g/cc, or 0.87 g/cc, or 0.88 g/cc to 0.89 g/cc;
  (iv) 50-85 wt % soft segment and 40-15 wt % hard segment;
  (v) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment;
  (vi) from 0.5 mol %, or 1.0 mol %, or 2.0 mol %, or 3.0 mol % to 4.0 mol %, or 5 mol %, or 6 mol %, or 7 mol %, or 9 mol % octene in the hard segment;
  (vii) a melt index (MI) from 1 g/10 min, or 2 g/10 min, or 5 g/10 min, or 7 g/10 min to 10 g/10 min to 15 g/10 min, or 20 g/10 min;
  (viii) a Shore A hardness from 65, or 70, or 71, or 72 to 73, or 74, or 75, or 77, or 79, or 80;
  (ix) an elastic recovery (Re) from 50%, or 60% to 70%, or 80%, or 90%, at 300% 300% $min^{-1}$ deformation rate at 21° C. as measured in accordance with ASTM D 1708; and
  (x) a polydisperse distribution of blocks and a polydisperse distribution of block sizes.

In an embodiment, the ethylene/$C_{4-12}$ α-olefin multi-block copolymer is an ethylene/octene multi-block copolymer with one, some, or all properties (i)-(x) above.

In an embodiment, the present composition includes two ethylene/α-olefin multi-block copolymers—a first ethylene/α-olefin multi-block copolymer (B-1) and a second ethylene/α-olefin multi-block copolymer (B-2). The second ethylene/α-olefin multi-block copolymer (B-2) is different than the ethylene/α-olefin multi-block copolymer (B-1). The first ethylene/α-olefin multi-block copolymer (B-1) and the second ethylene/α-olefin multi-block copolymer (B-2) can be any ethylene/α-olefin multi-block copolymer as described herein. The second ethylene/α-olefin multi-block copolymer is "different than" the first ethylene/α-olefin multi-block copolymer such that at least one property for the second ethylene/α-olefin multi-block copolymer is different when compared to the first ethylene/α-olefin multi-block copolymer. Nonlimiting examples of properties that can differ between the second ethylene/α-olefin multi-block copolymer and the first ethylene/α-olefin multi-block copolymer include ethylene content, comonomer type, comonomer content, density, MI, Tm, Re, Mw, Mn, MWD, etc.).

In an embodiment, the first ethylene/α-olefin multi-block copolymer (B-1) and the second ethylene/α-olefin multi-block copolymer (B-2) have the properties as set forth in Table 1 below.

TABLE 1

Properties for the first ethylene/α-olefin multi-block copolymer and the second ethylene/α-olefin multi-block copolymer

| Property | B-1 | B-2 |
|---|---|---|
| Comonomer | Octene | Octene |
| Density (g/cc) | 0.870-0.880 | 0.881-0.890 |
| Melt Index (g/10 min) | 0.1-1.0 | 25-35 |

TABLE 1-continued

Properties for the first ethylene/α-olefin multi-block copolymer and the second ethylene/α-olefin multi-block copolymer

| Property | B-1 | B-2 |
|---|---|---|
| Tm (° C.) | 122 | 122 |
| Hardness (Shore A) | 75-80 | 81-86 |

In an embodiment, at least one of the ethylene/α-olefin multi-block copolymer is sold under the Tradename INFUSE™ available from The Dow Chemical Company, Midland, Mich., USA.

In an embodiment, at least one (or at least two) of the ethylene/α-olefin multi-block copolymer is selected from INFUSE™ 9010 INFUSE™ 9100, INFUSE™ 9507, INFUSE™ 9530, and INFUSE™ 9807.

In an embodiment, at least one of the ethylene/α-olefin multi-block copolymers is D9900.05 available from The Dow Chemical Company.

The present ethylene/α-olefin multi-block copolymer may comprise two or more embodiments disclosed herein.

3. Flame Retardant

The present composition includes at least one flame retardant. The flame retardant is a solid in granular form or in powder form. Nonlimiting examples of suitable flame retardant include alumina hydroxide (ATH), magnesium hydroxide (MDH), huntite/hydromagnesite, N- and P-based flame retardants (e.g., melamine-poly(aluminumphosphate) or melamine-poly(zincphosphate)), calcium carbonate, zinc oxide, aluminum silicate, calcium silicate, barium sulfate, titanium dioxide, antimony oxide, titanates, borates, mica, talc, glass (such as glass fiber and glass microspheres), nano-clay, and combinations thereof.

In an embodiment, the flame retardant is halogen-free. A "halogen-free flame retardant" is a flame retardant that is void of halogen atom (void of F, Cl, Br, I).

In an embodiment, the flame retardant is present in an amount to provide the present composition with a flame retardance rating of classification D as measured in accordance with EN ISO 11925-2 for the surface ignition test.

The flame retardant may comprise two or more embodiments described herein.

4. Additives

The present composition may include one or more optional additives. Suitable additives include, but are not limited to, flame retardants, antioxidants, UV stabilizers, foaming agents, colorants or pigments, and combinations thereof.

Nonlimiting examples of suitable flame retardant include N- and P-based flame retardants (e.g., melamine-poly(aluminumphosphate) and/or melamine-poly(zincphosphate)).

In an embodiment, the composition includes from 1 wt % to 5 wt % of an additive package. The additive package includes ethylene-based polymer carrier, a thermal stabilizer, a hindered amine light stabilizer (HALS), and titanium dioxide: The additive package includes from 30 wt % to 40 wt % of the ethylene-based polymer carrier, from 1 wt % to 5 wt % of the thermal stabilizer, from 5 wt % to 15 wt % of the HALS, and from 45 wt % to 55 wt % of titanium dioxide.

The present disclosure provides another composition. In an embodiment, the composition includes
  A) an ethylene/acetate interpolymer;
  B) an ethylene/α-olefin multi-block copolymer; and
  C) a flame retardant.

The term, "ethylene/acetate interpolymer," as used herein, is an interpolymer that comprises ethylene monomer and acetate comonomer. Nonlimiting examples of suitable ethylene/acetate interpolymer include ethylene vinyl acetate copolymer.

In an embodiment, the ethylene/acetate interpolymer is a maleic anhydride grafted ethylene/acetate copolymer.

The ethylene/α-olefin multi-block copolymer and the flame retardant may be any respective ethylene/α-olefin multi-block copolymer may comprise two or more embodiments disclosed herein and flame retardant as previously disclosed herein.

5. Composition

In an embodiment, the present composition (Composition 1) contains (A) from 5 wt %, or 7 wt %, or 9 wt %, or 10 wt %, or 15 wt %, or 19.6 wt % to 20 wt %, or 25 wt %, or 30 wt % of a grafted ethylene/acrylate interpolymer;

(B-1) from 15 wt %, or 18 wt % to 20 wt %, or 22 wt %, or 25 wt % of a first ethylene/α-olefin multi-block copolymer;

(B-2) from 10 wt %, or 12 wt % to 15 wt %, or 18 wt %, or 20 wt % of a second ethylene/α-olefin multi-block copolymer, the second ethylene/α-olefin multi-block copolymer different than the first ethylene/α-olefin multi-block copolymer; and (C) from 40 wt %, or 43 wt % to 45 wt %, or 48 wt %, or 50 wt %, or 55 wt % flame retardant.

In an embodiment, Composition 1 has a dirt pick-up resistance (DPUR) (non-UV exposed) from 3.0, or 3.2, or 3.5, or 3.7, or 3.9, or 4.0, or 4.1 to 4.3, or 4.5, or 4.7, or 4.9, or 5.0, or 5.1, or 5.3, or 5.5.

In an embodiment, Composition 1 has a dirt pick-up resistance DPUR (UV exposed) from 3.0, or 3.3, or 3.5, or 3.7, or 3.9 to 4.0, or 4.3, or 4.5, or 4.7, or 4.9, or 5.0, or 5.1.

In an embodiment, Composition 1 has a tensile strength from 12.0 MPa, or 12.5 MPa, or 13.0 MPa, or 14.0 MPa, or 14.5 MPa to 15.0 MPa, or 16.0 MPa, or 16.5 MPa, or 17.0 MPa.

In an embodiment, Composition 1 has an elongation at break from 500%, or 501%, or 510%, or 525%, or 550%, or 575%, or 600% to 625%, or 650%, or 675%, or 700%.

In an embodiment, Composition 1 excludes (or is otherwise void of) tackifiers.

The composition (and/or Composition 1) may comprise two or more embodiments disclosed herein.

In an embodiment, the composition (Composition 2) includes (A) from 7 wt %, or 8 wt %, or 9 wt %, or 10 wt % to 12 wt %, or 15 wt %, or 17 wt %, or 20 wt % of the ethylene vinyl acetate copolymer;

(B-1) from 18 wt %, or 19 wt % to 20 wt % to 22 wt %, or 24 wt %, or 25 wt % of a first ethylene/α-olefin multi-block copolymer;

(B-2) from 12 wt %, or 14 wt % to 15 wt %, or 16 wt %, of a second ethylene/α-olefin multi-block copolymer, the second ethylene/α-olefin multi-block copolymer different than the first ethylene/α-olefin multi-block copolymer; and (C) from 44 wt %, or 45 wt %, or 46 wt %, or 48 wt % to 49 wt %, or 50 wt %, or 51 wt % flame retardant.

In an embodiment, Composition 2 has a DPUR (non-UV exposed) from 3.0 to 3.3, or 3.5.

In an embodiment, Composition 2 has a DPUR (UV exposed) from 3.0, or 3.2, or 3.3 to 3.4, or 3.5, or 3.6.

In an embodiment, Composition 2 has a tensile strength from 12.0 MPa, or 12.5 MPa, or 13.0 MPa, or 14.0 MPa, or 14.5 MPa to 15.0 MPa, or 16.0.

In an embodiment, Composition 2 has an elongation at break from 500%, or 505% to 507%, or 509%, or 510%.

In an embodiment, Composition 2 excludes (or is otherwise void of) tackifiers.

Composition 2 may comprise two or more embodiments disclosed herein.

6. Article

The present disclosure provides an article. The article includes the present composition, such as Composition 1 or Composition 2.

In an embodiment, the article is a sheet.

In an embodiment, the article is a film.

In one embodiment, the article is a roofing component.

The present disclosure provides another article. In an embodiment, the article is a roofing membrane. The roofing membrane includes at least one layer containing the present composition. The roofing membrane may be a single layer or may be composed of multiple layers. The roofing membrane has a thickness from 35 mils, or 40 mils, or 45 mils, or 50 mils to 55 mils, or 60 mils, or 65 mils, or 70 mils, or 75 mils, or 80 mils, or 90 mils. The thicknesses of 45 mil, 60 mil, and 80 mil are common industry standards. In a further embodiment, the roofing membrane is halogen-free.

In an embodiment, the roofing membrane is a multilayer structure and may contain a reinforcing fabric or scrim reinforcement material in the center between two layers of the roofing membrane. The roofing membrane exhibits dirt pick-up resistance, flexibility, longevity, flame retardance, UV resistance, and chemical resistance. In addition, roofing membrane is capable of forming hot-air welded seams.

In an embodiment, the roofing membrane has the following multilayer structure (from top to bottom):

(1) Top layer;
(2) Film layer (typically coextruded with top layer);
(3) Glass fleece;
(4) Scrim layer (typically fabric);
(5) Bottom layer; and
(6) Backing substrate (for adhesion, typically fleece).

In an embodiment, the roofing membrane has a top layer that includes, or is otherwise made from, the present composition, such as Composition 1, or Composition 2. The composition present in the top layer includes A) from 5 wt %, or 7 wt %, or 9 wt %, or 10 wt %, or 15 wt %, or 19.6 wt % to 20 wt %, or 25 wt %, or 30 wt % of a grafted ethylene/acrylate interpolymer (for Composition 1) or an ethylene/acetate interpolymer (for Composition 2);

(B-1) from 15 wt %, or 18 wt % to 20 wt %, or 22 wt %, or 25 wt % of a first ethylene/α-olefin multi-block copolymer;

(B-2) from 10 wt %, or 12 wt % to 15 wt %, or 18 wt %, or 20 wt % of a second ethylene/α-olefin multi-block copolymer, the second ethylene/α-olefin multi-block copolymer different than the first ethylene/α-olefin multi-block copolymer; and (C) from 40 wt %, or 43 wt % to 45 wt %, or 48 wt %, or 50 wt %, or 55 wt % flame retardant.

In an embodiment, the top layer of the roofing membrane has a dirt pick-up resistance (DPUR) (non-UV exposed) from 3.0, or 3.2 or 3.5, or 3.7 or 3.9, or 4.0 or 4.1 to 4.3, or 4.5 or 4.7, or 4.9, or 5.0, or 5.1 or 5.3, or 5.5.

In an embodiment, the top layer of the roofing membrane has a dirt pick-up resistance (UV exposed) from 3.0, or 3.3 or 3.5, or 3.7, or 3.9 to 4.0, or 4.3, or 4.5, or 4.7, or 4.9, or 5.0 or 5.1.

In an embodiment, the top layer of the roofing membrane has a tensile strength from 12.0 MPa, or 12.5 MPa, or 13.0 MPa, or 14.0 MPa, or 15.0 MPa, or 16.0 MPa, or 16.5 MPa, or 17.0 MPa.

In an embodiment, Composition 1 or Composition 2 has an elongation at break from 500%, or 501%, or 510%, or 525%, or 550%, or 575%, or 600% to 625%, or 650%, or 675%, or 700%.

By way of example, and not by limitation, examples of the present disclosure are provided.

EXAMPLES

1. Materials

Materials used in the examples are provided in Table 2 below.

TABLE 2

Materials

| Component | Specification | Source |
|---|---|---|
| INFUSE 9010 | Ethylene/octene multi-block copolymer Density: 0.877 g/cc and MI: 0.5 g/10 min Shore A 77. | The Dow Chemical Company |
| D9900.05 | Ethylene/octene multi-block copolymer Density: 0.88 g/cc and MI: 30 g/10 min Shore A 83. | The Dow Chemical Company |
| Irgastab FS 301 LL | Thermal & Process stabilizer Odorless solid granules | BASF |
| Chimasorb 2020 | Hindered Amine Light Stabilizer Specific gravity: 1.01 g/cc and Melting range: 120-150° C. | BASF |
| Masterbarch PE 812416 | VERSIFY 2300 masterbatch with 4% TiO2, 0.1% Irgastab FS301FF, and 0.75% Chimassorb 2020 | Dow Internal |
| Martinal OL 104 GO | Fine precipitated Aluminum trihydroxide with proprietary coating, density: 2.4 g/cc | AlbeMarle Corporation |
| Amplify TY 4351 | Maleic anhydride grafted Ethylene ethyl acrylate, Density: 0.917 g/cc, MI: 7.5 g/10 min 12 wt % ethyl acrylate, 0.18% wt % MAH | The Dow Chemical Company |
| Lotader 4700 | Ethylene/ethyl acrylate/maleic anhydride terpolymers Density: 0.94 and MI: 7 g/10 min | Arkema |
| Elvaloy AC 3717 | Ethylene/butyl acrylate copolymer Density: 0.924 g/cc and MI: 7 g/10 min | DuPont Company |
| Amplify EA101 | Ethylene Ethyl acrylate Density: 0.931 g/cc, MI: 6 g/10 min | The Dow Chemical Company |
| Lotader 5500 | Ethylene/ethyl acrylate/maleic anhydride terpolymers Density: 0.94 and MI: 20 g/10 min, 20 wt % ethyl acrylate, 2.8 wt % MAH | Arkema |
| Primacor 3440 | Ethylene/Acrylic acid copolymer Density: 0.938 g/cc and MI: 11 g/10 min | The Dow Chemical Company |
| Taisox 7360M | Ethylene/vinyl acetate copolymer Density: 0.941 g/cc and MI: 2.5 g/10 min | Formosa Plastics Corporation |
| Dow Corning MB-50-313 | 50% UHMW PDMS in LLDPE masterbatch Carrier MI: 35 g/10 min | Dow Corning Company |
| Dowlex 2606G | LLDPE Density: 0.92 g/cc and MI: 4 g/10 min | The Dow Chemical Company |

2. Preparation of Test Sheets

Test sheets are produced using a 25 mm co-rotating twin screw extruder. All the polymers together with additive masterbatch are fed into a first hopper while the filler is fed into a second hopper. During extrusion, the polymers are melted and mixed together and the filler is added. The mixture enters the 300 mm wide die where the homogeneous melt is shaped into a sheet with a thickness of 1 millimeter (mm). Upon exit from the extruder die, the sheet passes through a three roll calendar and is wound upon a roll. The temperature range at the extruder is 170-220° C. and the calendar roll temperature is 40-45° C. The 1 mm thick continuous sheet is cut into A4 sized sheets for further evaluation.

The mechanical properties are tested according to EN ISO 527 using a tensile tester. The test specimens used are type 5A with a test speed of 200 mm/min. Tensile strength and elongation at break values are measured.

The composition and properties of the extruded sheets are provided at Table 3 below.

TABLE 3

Composition and properties of extruded sheets

| | | 25+ (control) [%] | 26 [%] | 27 [%] | 28 [%] | 29 [%] | 30 [%] | 31 [%] | 32 [%] |
|---|---|---|---|---|---|---|---|---|---|
| | | | | | Materials | | | | |
| GRANULES | | Constant | Constant | Constant | Constant | Constant | Constant | Constant | Constant |
| | INFUSE 9010 | 24.3 | 21.7 | 19.2 | 16.7 | 21.9 | 20.4 | 19.2 | 16.9 |
| | D9900.06 | 16.2 | 14.5 | 12.8 | 11.1 | 14.6 | 13.6 | 12.8 | 11.2 |
| | Irgastab FS 301 LL | 0.0 | 0.0 | 0.0 | 0.0 | 0.0 | 0.0 | 0.0 | 0.0 |
| | Chimasorb 2020 | 0.0 | 0.0 | 0.0 | 0.0 | 0.0 | 0.0 | 0.0 | 0.0 |
| | Masterbatch PE 812416 | 2.8 | 3.2 | 3.6 | 4.0 | 4.1 | 3.8 | 3.6 | 3.2 |
| | Martinal OL 104 GO | 56.7 | 50.7 | 44.8 | 39.0 | 51.1 | 47.5 | 44.8 | 39.3 |
| | Amplify TY 4351 | | 9.8 | 19.6 | 29.2 | | | | |
| | Lotader 4700 | | | | | 8.3 | | | |
| | Elvaloy AC 3717 | | | | | | 14.7 | | |

TABLE 3-continued

Composition and properties of extruded sheets

| | | | | | | | | |
|---|---|---|---|---|---|---|---|---|
| Amplify EA 101 | | | | | | | 19.6 | 29.4 |
| Lotader 5500 | | | | | | | | |
| Primacor 3440 | | | | | | | | |
| Taisox 7360M | | | | | | | | |
| Dow Corning MB-50-313 | | | | | | | | |
| Dowlex 2606G | | | | | | | | |
| Infuse 9010 | | | | | | | | |
| Total | 100.0 | 100.0 | 100.0 | 100.0 | 100.0 | 100.0 | 100.0 | 100.0 |
| Run Order | 3 | 4 | 5 | 6 | 7 | 8 | 9 | 10 |
| Layer Thickness (mm) | 1 mm | 1 mm | 1 mm | 1 mm | 1 mm | 1 mm | 1 mm | 1 mm |
| Tensile strength, MPa (MD)* | 11.6 | 12.6 | 16.6 | 18 | 7.8 | 9 | 15.8 | 15 |
| Elongation at Break (%) (MD)* | 532 | 508 | 444 | 443 | 699 | 553 | 401 | 363 |
| DPUR (delta E) UV-exposed | 5.34 | 3.67 | 4.84 | 6.47 | 4.43 | 4.44 | 4.13 | 3.66 |
| DPUR (delta E) Non-UV Exposed | 5.70 | 3.89 | 4.96 | 6.11 | 4.16 | 4.27 | 3.41 | 3.15 |
| Small Burner Test | Pass | Pass | Pass | Pass | Pass | Pass | Pass | Pass |

| | | Sample No. | | | | | |
|---|---|---|---|---|---|---|---|
| | | 33 [%] | 34 [%] | 35 [%] | 36[+] [%] | 37[+] [%] | 38[+] [%] |
| | | Materials | | | | | |
| GRANULES | | Constant | Constant | Constant | Constant | Constant | Constant |
| | INFUSE 9010 | 21.6 | 19.2 | 21.0 | 23.3 | | |
| | D9900.06 | 14.4 | 12.8 | 14.0 | 15.5 | | |
| | Irgastab FS 301 LL | 0.0 | 0.0 | 0.0 | 0.0 | | |
| | Chimasorb 2020 | 0.0 | 0.0 | 0.0 | 0.0 | | |
| | Masterbatch PE 812416 | 4.1 | 3.6 | 3.9 | 3.1 | | |
| | Martinal OL 104 GO | 50.3 | 44.8 | 48.9 | 54.3 | | |
| | Amplify TY 4351 | | | | | | |
| | Lotader 4700 | | | | | | |
| | Elvaloy AC 3717 | | | | | | |
| | Amplify EA 101 | | | | | | |
| | Lotader 5500 | 9.7 | | | | | |
| | Primacor 3440 | | 19.6 | | | | |
| | Taisox 7360M | | | 12.2 | | | |
| | Dow Corning MB-50-313 | | | | 3.9 | | |
| | Dowlex 2606G | | | | | 100.0 | |
| | Infuse 9010 | | | | | | 100.0 |
| | Total | 100.0 | 100.0 | 100.0 | 100.0 | 100.0 | 100.0 |
| | Run Order | 11 | 14 | 12 | 13 | 1 | 2 |
| | Layer Thickness (mm) | 1 mm | 1 mm | 1 mm | 1 mm | 1 mm | 1 mm |
| | Tensile strength, MPa (MD)* | 12 | 10.5 | 14.5 | 11 | 31 | 14.4 |
| | Elongation at Break (%) (MD)* | 489 | 80 | 511 | 506 | 764 | 281 |
| | DPUR (delta E) UV-exposed | 5.02 | 5.02 | 3.48 | 7.41 | 7.02 | 11.9 |
| | DPUR (delta E) Non-UV Exposed | 4.52 | 5.21 | 3.00 | 8.11 | 5.77 | 9.6 |
| | Small Burner Test | Pass | Pass | Pass | Pass | Pass | Pass |

[+]comparative
*MD—machine direction

A lower DPUR value (lower delta E) corresponds to a smaller total change in color of the sample before and after dirt application. Therefore, the samples having a DPUR value less than the DPUR value of Comparative Sample 25 show improvement in dirt pick-up resistance.

Table 3 compares different compositions of ethylene/acrylate interpolymers (un-functionalized v functionalized) and the amount of each in the final composition and the effect on DPUR values. Samples 26-29 and 31-32 contain ethylene ethyl acrylate (EEA). Sample 30 contains ethylene butyl acrylate (EBA). Sample 34 contains ethylene acrylic acid (EAA). Sample 35 contains ethylene vinyl acetate (EVA). Sample 36 contains PDMS.

The results in Table 3 show samples containing ethylene/acrylate copolymer with an ester functional group exhibit low DPUR. Most desirable is a composition with DPUR value less than the DPUR value for control sample 25—i.e., a DPUR less than 5.70 (non-UV-exposed) and/or a DPUR less than 5.34 (UV-exposed).

Overall, Sample 26 (9.8 wt % MAH-g-EEA) and Sample 35 (12.2 wt % EVA) provide the best combination of properties: (1) DPUR less than 5.7 non-UV-exposed (Sample 26, 3.89 non-UV exposed; Sample 35 3.00 non-UV-exposed), (2) tensile strength greater than 12 MPa (Sample 26, 12.6 MPa; Sample 35 14.5 MPa), and (3) elongation at break greater than 500% (Sample 26, 508%; Sample 35 511%).

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
   A) a functionalized grafted ethylene/acrylate interpolymer;
   B) an ethylene/α-olefin multi-block copolymer; and
   C) a flame retardant.

2. The composition of claim 1 wherein the grafted ethylene-based acrylate interpolymer is a maleic anhydride-grafted-ethylene/acrylate copolymer.

3. The composition of claim 1 comprising a first ethylene/α-olefin multi-block copolymer and a second ethylene/α-olefin multi-block copolymer, and the second ethylene/α-olefin multi-block copolymer is different than the first ethylene/α-olefin multi-block copolymer.

4. A composition comprising:
   (A) from 5 wt % to 30 wt % of a grafted ethylene/acrylate interpolymer;
   (B-1) from 15 wt % to 25 wt % of a first ethylene/α-olefin multi-block copolymer;
   (B-2) from 10 wt % to 20 wt % of a second ethylene/α-olefin multi-block copolymer, the second ethylene/α-olefin multi-block copolymer different than the first ethylene/α-olefin multi-block copolymer; and
   (C) from 40 wt % to 55 wt % flame retardant.

5. The composition of claim 4 wherein the composition has a dirt pick-up resistance (non-UV exposed) from 3.0 to 5.5.

6. The composition of claim 4 wherein the composition has a dirt pick-up resistance (UV exposed) from 3.0 to 5.1.

7. An article comprising the composition of claim 1.

8. The article of claim 7 wherein the article is selected from the group consisting of a sheet, a film, and a roofing component.

9. A roofing membrane comprising:
   at least one layer containing a composition comprising
   (A) from 5 wt % to 30 wt % of a grafted ethylene/acrylate interpolymer;
   (B-1) from 15 wt % to 25 wt % of a first ethylene/α-olefin multi-block copolymer;
   (B-2) from 10 wt % to 20 wt % of a second ethylene/α-olefin multi-block copolymer, the second ethylene/α-olefin multi-block copolymer different than the first ethylene/α-olefin multi-block copolymer; and
   (C) from 40 wt % to 55 wt % of a flame retardant.

10. The roofing membrane of claim 9 wherein the composition has a dirt pick-up resistance (non-UV exposed) from 3.0 to 5.5.

11. The roofing membrane of claim 9 wherein the composition has a dirt pick-up resistance (UV exposed) from 3.0 to 5.1.

12. The roofing membrane of claim 9 wherein the composition has a tensile strength from 12.0 MPa to 17.0 MPa.

13. The roofing membrane of claim 9 wherein the roofing membrane has a elongation at break from greater than 500% to 700%.

14. The roofing membrane of claim 9 wherein the at least one layer is a top layer of the roofing membrane.

15. An article comprising the composition of claim 4.

16. The article of claim 15 wherein the article is selected from the group consisting of a sheet, a film, and a roofing component.

* * * * *